(12) United States Patent
Reed (10) Patent No.: US 7,175,793 B1
(45) Date of Patent: Feb. 13, 2007

(54) LAMPS WITHIN FULL BODIED EXACT REPLICAS OF NATURAL OBJECTS

(76) Inventor: H. David Reed, 90 Page Brook Rd., Carlisle, MA (US) 01741

( * ) Notice: Subject to any disclaimer, the term of this patent is extended or adjusted under 35 U.S.C. 154(b) by 477 days.

(21) Appl. No.: 10/868,611

(22) Filed: Jun. 15, 2004

(51) Int. Cl.
*B29C 33/38* (2006.01)
*B29C 39/02* (2006.01)

(52) U.S. Cl. .................. 264/225; 264/220; 264/299

(58) Field of Classification Search ............. 264/220, 264/225, 299; 428/15
See application file for complete search history.

(56) References Cited

U.S. PATENT DOCUMENTS

| | | | | |
|---|---|---|---|---|
| 3,886,252 A | * | 5/1975 | Eker et al. ................. | 264/225 |
| 3,950,477 A | * | 4/1976 | Di Giacomo ............... | 264/226 |
| 4,758,934 A | * | 7/1988 | von Kohorn ............... | 362/145 |
| 4,960,622 A | * | 10/1990 | Jarboe et al. .............. | 428/15 |
| 5,619,189 A | * | 4/1997 | Sugawara .................. | 340/3.71 |
| 5,803,594 A | * | 9/1998 | Fredrickson et al. ........ | 362/351 |
| 6,042,766 A | * | 3/2000 | Bahr ........................ | 264/46.6 |
| 6,168,290 B1 | * | 1/2001 | Christiansen .............. | 362/253 |
| 6,220,718 B1 | * | 4/2001 | Burgess .................... | 362/101 |
| 6,409,359 B1 | * | 6/2002 | O'Connell ................. | 362/145 |
| 6,607,683 B1 | * | 8/2003 | Harrington ................ | 264/227 |

* cited by examiner

*Primary Examiner*—Allan R. Kuhns
(74) *Attorney, Agent, or Firm*—Robert Nathans (57) ABSTRACT

A realistic three-dimensional replica casting of naturally occurring samples of wood, rock and marine specimens produces realistic appearing landscape or indoor light modules that can simulate flickering candles in nightclubs and restaurants. The method employs a two-part barrier mold technique enabling production of an exact copy of the whole, full bodied, original specimen and includes a lamp unit pattern for creating a three dimensional space for containing a lamp module that is positioned adjacent a relatively flat face of the replica of the natural specimen. The final casting is made of fortified cement that is permanently stained with metallic salts in an HCL solution producing the desired coloration matching that of the original specimen while masking the color of the concrete. The replica is solid and heavy and need not be attached to the ground during outdoor use to maintain it in place, due to the weight of the concrete.

19 Claims, 12 Drawing Sheets

LAMPS WITHIN FULL BODIED EXACT REPLICAS OF NATURAL OBJECTS

BACKGROUND OF THE INVENTION

It is desirable to produce three-dimensional lamp modules having highly realistic appearing replicas of wood, rock and marine specimens. Such modules could be placed along a pathway to a home to enhance the landscape and aid in the illumination of the pathway in darkness by directly lighting the pathway. If the landscape is rocky, the lamp modules would preferably be realistic replicas of rocks. If the landscape is located along the seashore, the lamp modules could be realistic replicas of sea shells or driftwood. The lamp modules would appear to be natural rocks, seashells or driftwood during the day and would look like lamp modules only when illuminated.

The desired lamp modules are fairly small and heavy so that if they are used to directly illuminate pathways to a home they need not be anchored to the ground and will remain in place due to their weight. This is in contrast with U.S. Pat. No. 5,803,594 to Fredrickson who teaches use of a thin shell having a thickness of one sixteenth of an inch that simulates a rock for covering lamp fixtures somewhat in the manner of a blanket. Since the shell is light it has to be affixed to the ground with spikes or the like to stop wind and rain from uncovering the lamps. This is in contrast with the present invention that is preferably made from heavy material such as concrete to eliminate the spikes. Due to the "blanket" shell, the lighting effect is diffuse where the preferred embodiments of the invention can provide direct lighting for use beside pathways or on the tables of dimly lit nightclubs. Also, our replicas are full-bodied three-dimensional realistic replicas of natural specimens in contrast with the Fredrickson arrangement. In other words our method can produce an exact copy of the specimen.

Figures 1, 2, 3:
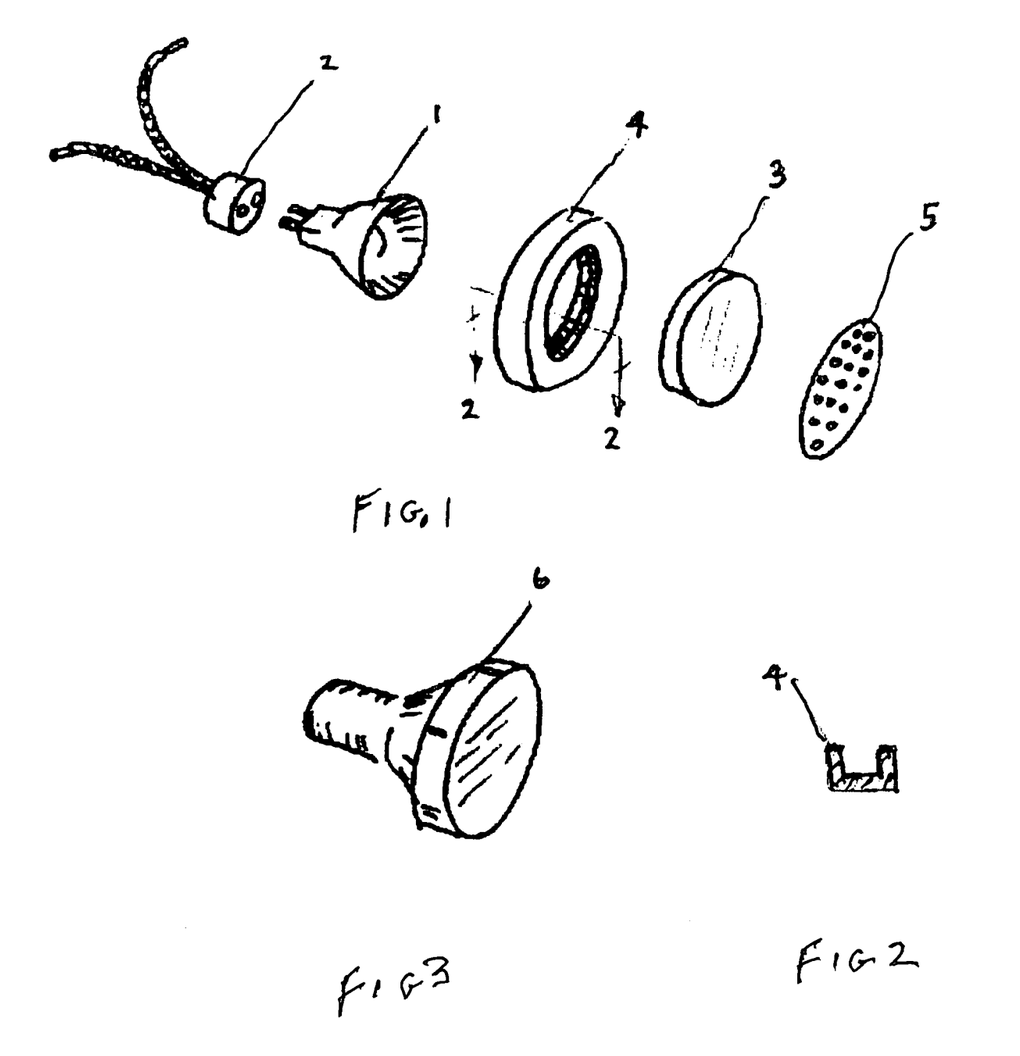
FIGS. 1–3 disclose the lamp components.

FIG. 1 of U.S. Pat. No. 4,758,934 to von Kohron and, O'Connell U.S. Pat. No. 6,409,359 likewise teach the shells having surface textures simulating rocks that "blanket" lamp fixtures. These patents also do not involve direct lighting of pathways or other selected areas such as nightclub tables to be illuminated. They do not provide full-bodied solid simulated "natural" objects having discreet lamp storage portions molded therein; likewise with respect to Christiansen U.S. Pat. No. 6,168,290.

Also, battery powered lamp modules may also be placed on tables or shelves in dimly lit restaurants or nightclubs to enhance the atmospheres therein. They would be good substitutes for candles which some people find objectionable. Also, candles emit overly strong light, are messy to maintain, and can be smelly. For example seafood restaurants could use the "seashell" or driftwood modules. For these applications the lamp modules could optionally contain a micro-processor such as a PIC 16F84 for producing lamp flicker to simulate a flickering candle; see U.S. Pat. No. 6,220,718.

Also, in contrast with the present invention, in our opinion it is not practicable to cut optical component storing cavities enclosed within actual specimens of rocks, seashells or the like.

BRIEF SUMMARY OF PREFERRED EMBODIMENTS OF THE INVENTION

Highly realistic replicas of rocks, seashells and driftwood having a flat face are created by employing a special two-part rubber barrier molding technique around a selected natural specimen, wherein a two part fiberglass reinforced rubber mold is created having highly refined surface details of the original specimen. The mold includes a lamp unit pattern for creating a three-dimensional space in the replica for containing optical components that are positioned adjacent a relatively flat face of the replicas of the natural specimens.

Fortified cement is poured through a sprue in the mold and the resulting cement replica is removed, and thereafter treated with acids and colored with dyes as appropriate to match the base color of the original specimen being duplicated. Electrical lamp components are positioned within the three dimensional space formed by the pattern adjacent a flat front face of the replica. The result is a lamp having a desired fairly heavy, full-bodied excellent replica of the entire natural specimen. A thin vinyl micro-mesh film for blocking the appearance of the un-illuminated lamp may be positioned over the lamp and be imprinted with the same coloration scheme as the specimen to be duplicated.

BRIEF DESCRIPTION OF THE DRAWINGS

Other features and advantages of the invention will become more apparent upon study of the following detailed description taken in conjunction with the drawings in which.

DETAILED DESCRIPTION OF PREFERRED EMBODIMENTS OF THE INVENTION

The preferred process of creating the replicated lamp module from the natural specimen is as follows.

Step A; FIGS. 1 and 2. Provide a 12 volt halogen lamp 1, a mounting base 2 (bi-pin base for halogen lamp), a suitable safety glass window 3 having a 1 13/16" diameter, and made of 1 1/8" thick tempered glass, and a waterproof, u-shaped sealing gasket 4, (see its cross section in FIG. 2) of formed silicone that fully captures lens or flat safety window 3 for the desired lighting application. A thin vinyl micro-mesh film 5 is imprinted with the same coloration scheme as the specimen to be duplicated.

Step B; FIG. 3. Create a three dimensional composite model 6 of the shape of assembled lamp 1, mounting base 2 and lens 3. This model is made from semi-soft material such as clay or rubber and will be used as a pattern for the lamp cavity within the replicated lighting module.

Figure 4:
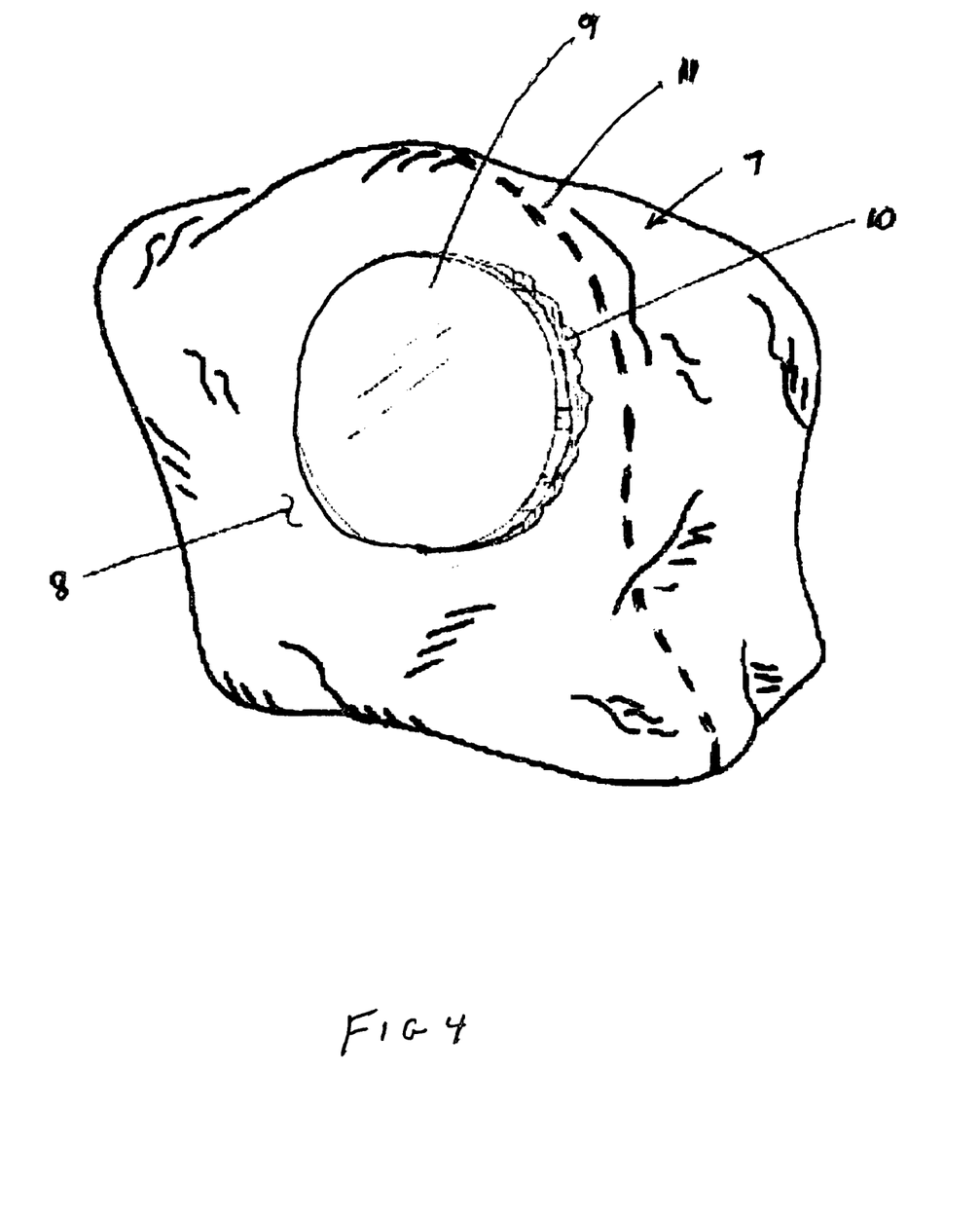
FIG. 4 discloses the natural separation line 11 around the specimen that will serve as mating line for a two or more part composite rubber mold of the specimen.

Step C; FIG. 4. Select a specimen 7 of a real object (mineral, botanical, marine) to be copied and recreated as the housing for the lighting components. This replication of the real object should be able to fully enclose the lamp cavity as modeled.

Step D. Identify a fairly flat face portion 8 of the selected specimen 7 that will contain the safety window or lens through which the light will be emitted from the replica.

Apply a flat, two inch diameter, ⅛ inch thick marker 9 to this location using clay 10 as a temporary adhesive to facilitate later production of a light emitting orifice within the face portion 8 of the replicated housing.

Step E: identify and optionally mark a natural separation line 11 all the way around the specimen that will serve as mating or boundary line for a two (or possibly more) part flexible rubber mold of the specimen. A two part mold will be described in detail for the sake of simplicity.

Figure 5:
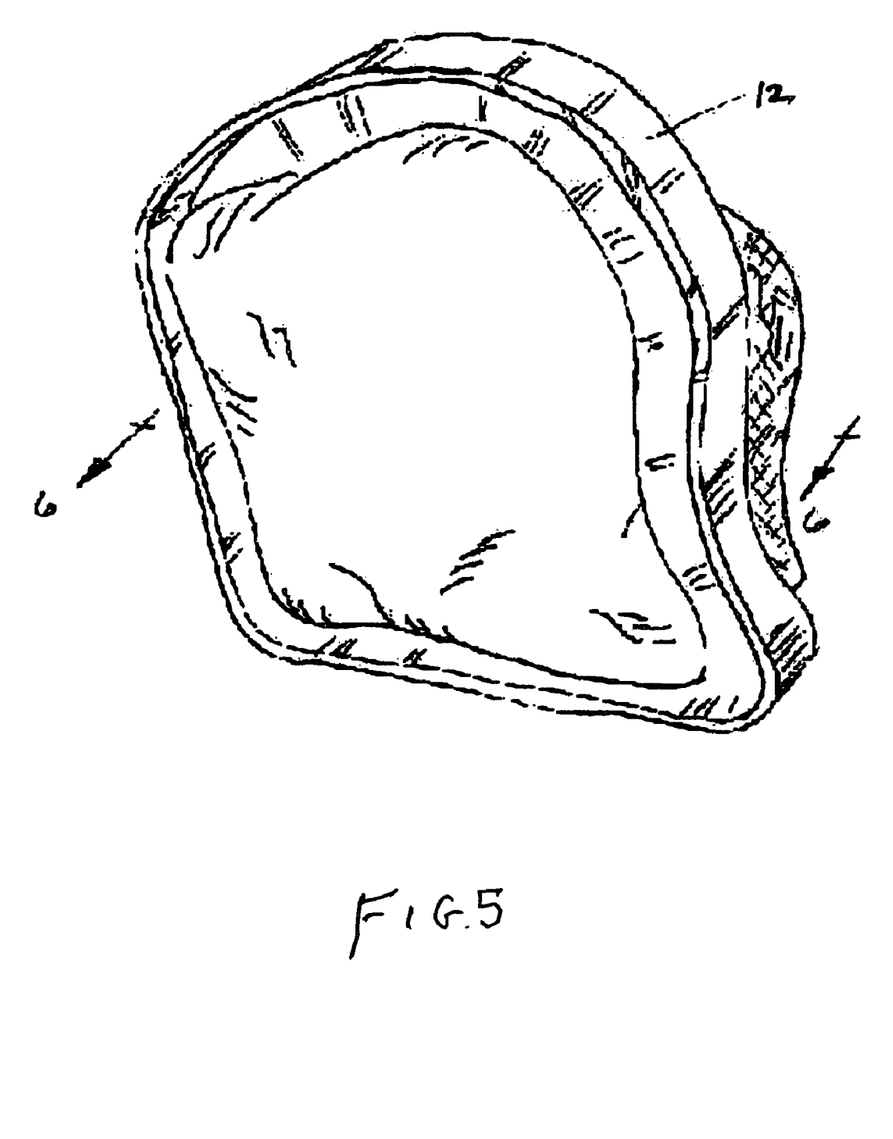
FIGS. 5–8 disclose details of the barrier molding technique, FIG. 6 being a partial cross section of FIG. 5.
Figure 6:
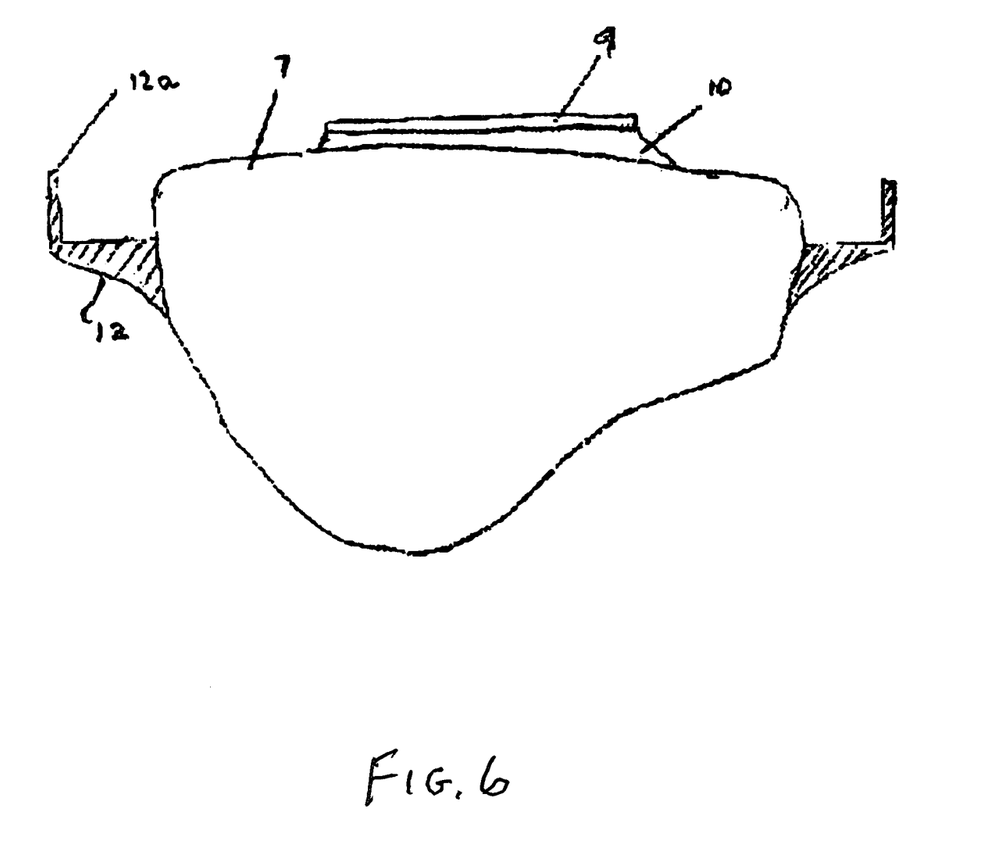

Step F; FIGS. 5 and 6. Attach a suitable medium 12 such as clay or cardboard along the entire length of separation line 11 to form a flat protruding surface with a vertical side 12a that will act as a flow barrier to contain the sequential application and buildup of liquid mold rubber upon the specimen.

Figure 7:
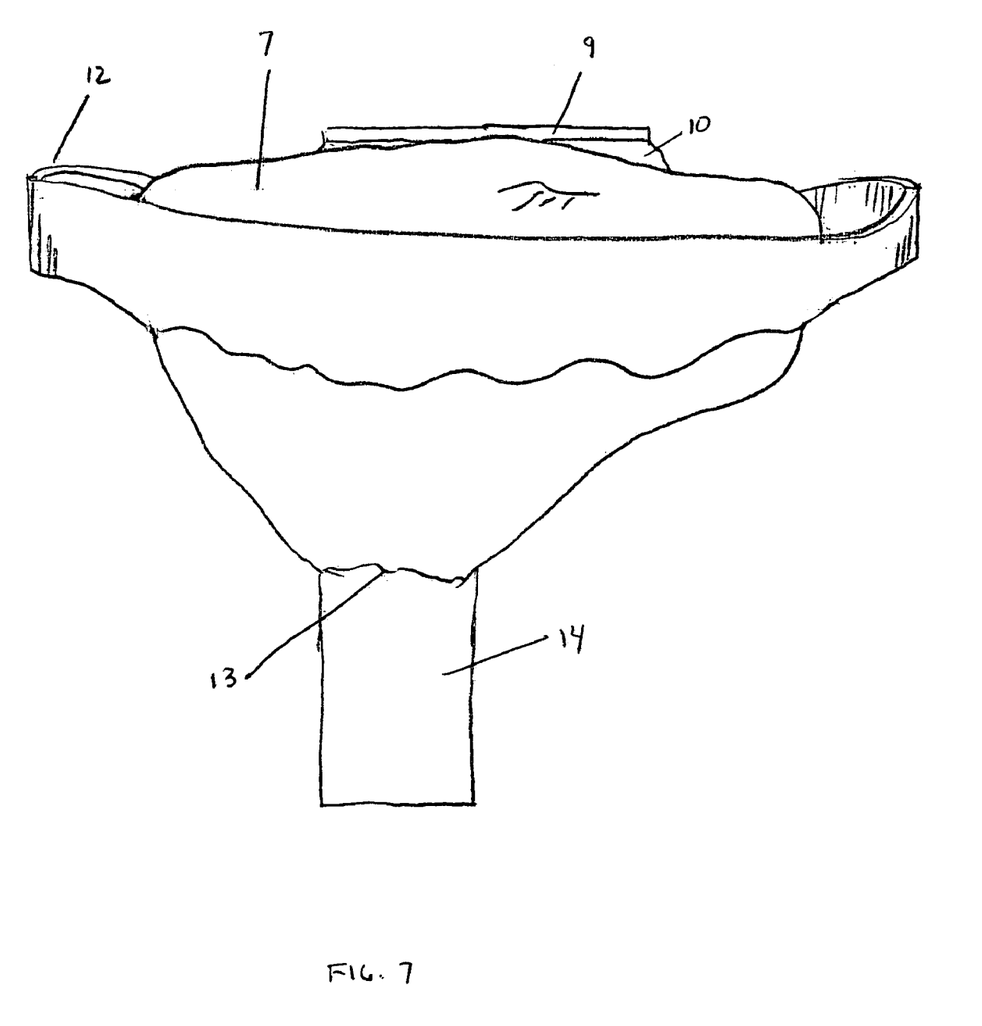

Step G; FIG. 7. Identify an appropriate location 13 for a sprue 14a through which will be poured the medium, preferably concrete, that will form the final replica of the specimen. Fashion a solid version 14 of the inside cavity of the sprue out of clay and attach it to the specimen.

Figure 8:
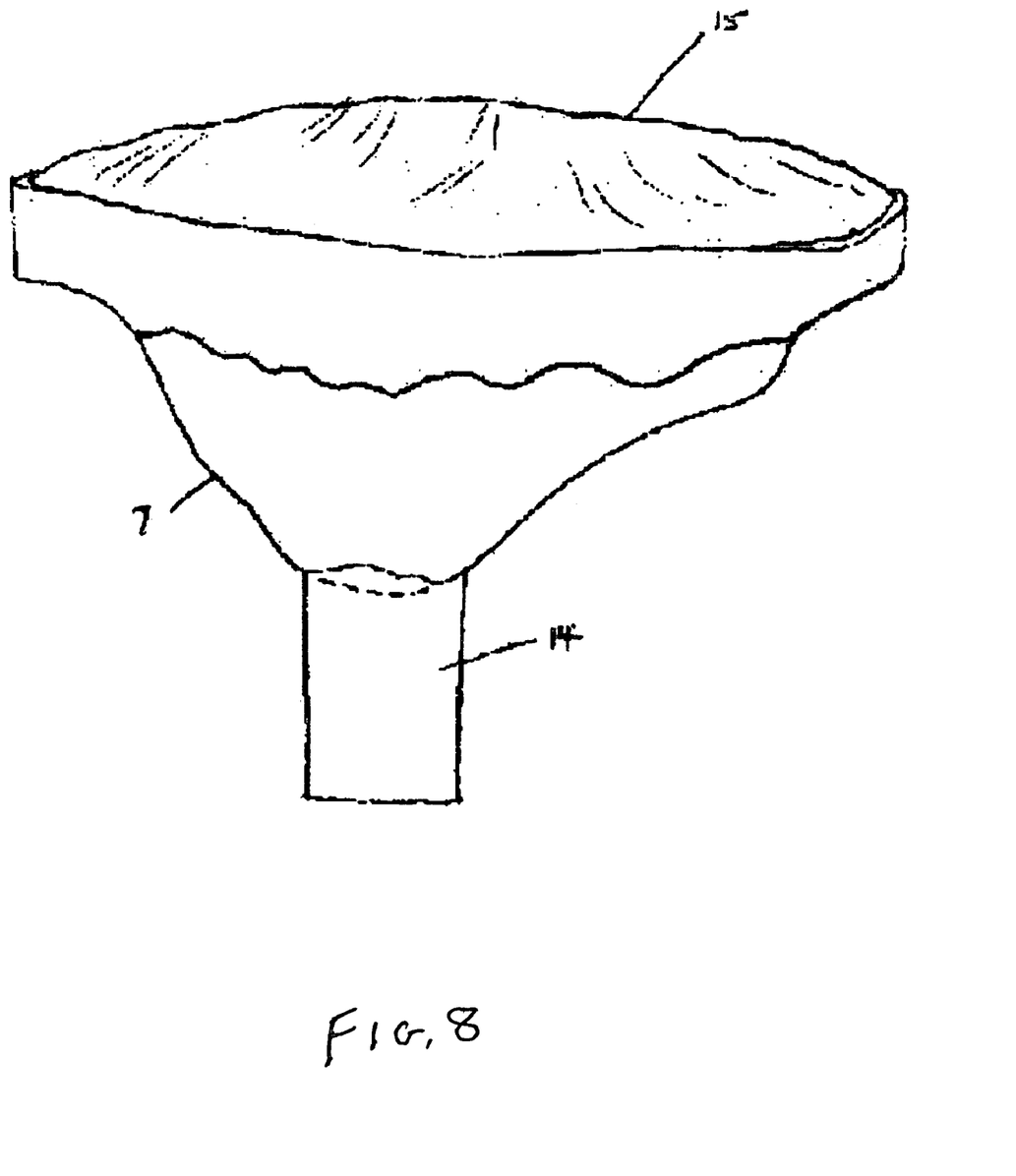

Step H; FIG. 8. Apply a release agent to the specimen and the flow barrier and apply a low viscosity (600–1,000 cps), low hardness (40 durometer) liquid urethane or liquid silicone rubber (liquid rubber) to the first half portion of the specimen as defined by the mold flow barrier. Before the first coating of liquid rubber has fully cured and is still tacky, apply two subsequent coats of liquid rubber using thickeners as necessary to allow the urethane to adhere without sagging, thus building up thickened material 15 around the specimen before it fully cures.

Figure 9:
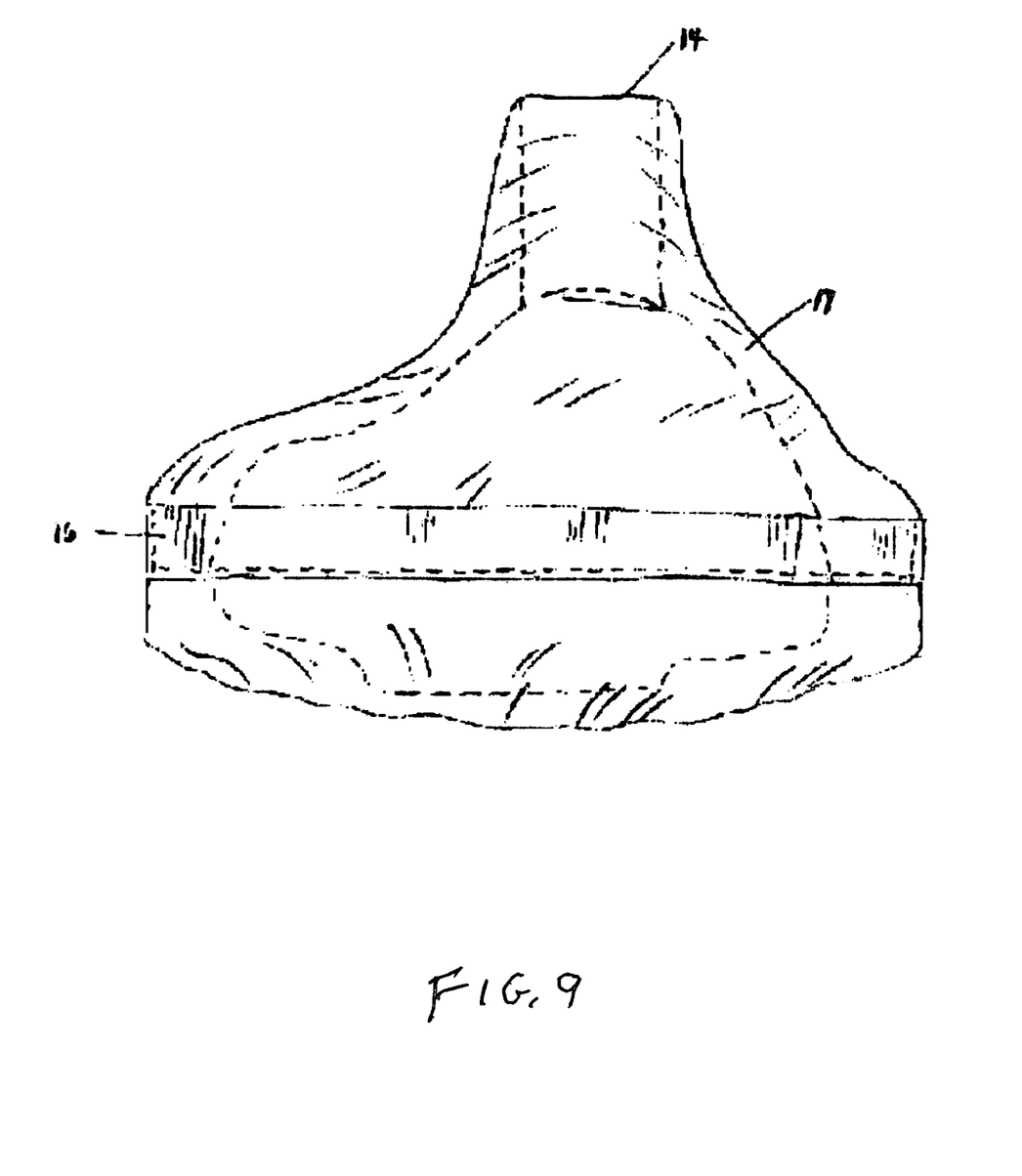
FIGS. 9 and 10 disclose the composite reinforced rubber mold having the spru passage therein.

Step I, FIG. 9. When the liquid rubber has cured, affix another vertical flow barrier 16 configured like flow barrier 12 to the sides of this first half of the mold to retain liquid rubber 17 as it is applied to the second half of the specimen.

Optionally, flow barrier 12 could remain in place and be used as the flow barrier for producing the second half of the flexible rubber mold.

In this case, another vertical member such as 12a in FIG. 6 could extend downwardly rather than upwardly.

Figure 10:
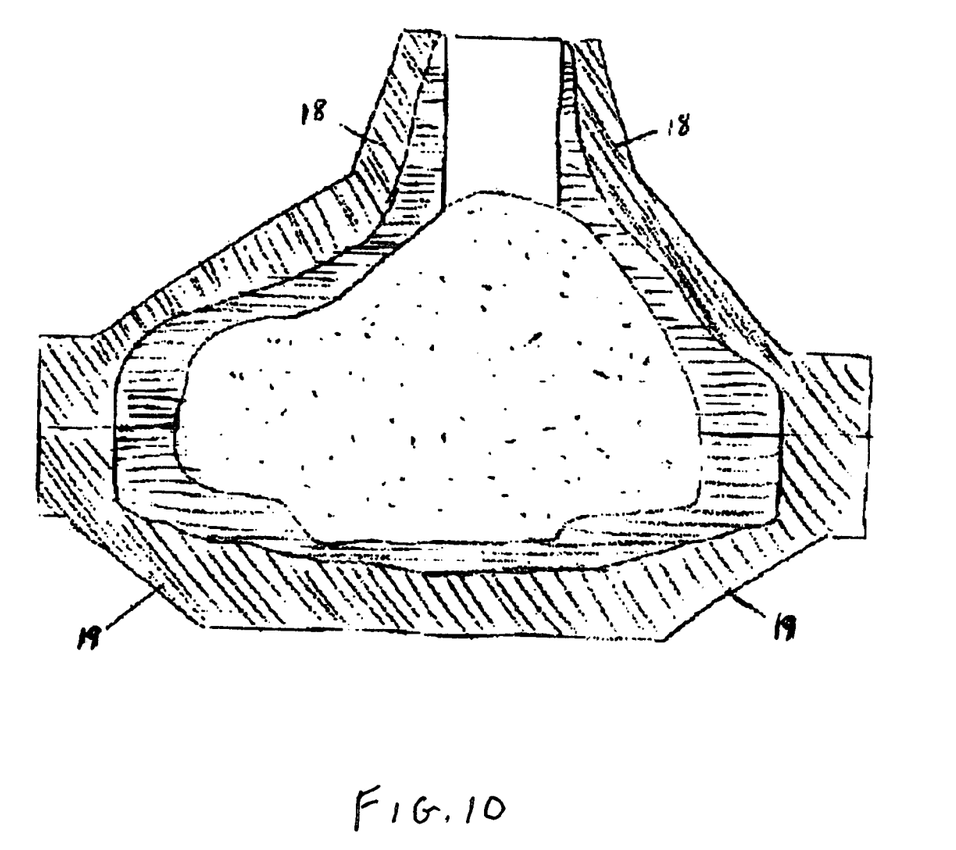

Step J, FIG. 10. With the specimen 7 now fully encased in liquid rubber forming the whole inside rubber mold, apply a coat of release agent to the entire mold. Then, following the previously established separation line 11, fashion two or more piece 18, 19 outer reinforcement shell members, shaped from fiberglass, and affix them directly to the rubber mold halves to fully contain and hold their shape, after the enclosed specimen is removed.

Figure 11:
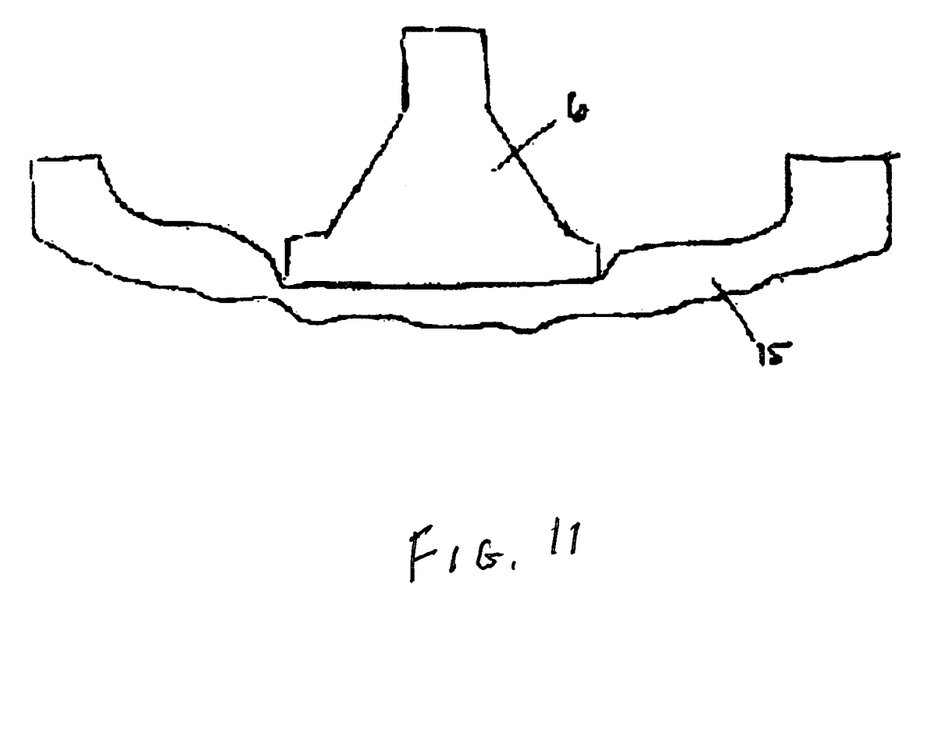
FIGS. 11 and 12 disclose the pattern attached to the inner rubber mold portion of the composite mold for forming the lamp containing void in the replica.

Step K, FIG. 11. Remove the outer shell members 18 and 19 with the rubber mold sections therein and remove the specimen and it's attached lamp marker 9. Using a rubber adhesive, affix the three dimensional pattern model of the lamp and base 6 (see FIG. 1) to the inside of that mold section which contains the inside surface created by the lamp marker 9 indicating desired location of the light exit area on the face of the replicated light module.

Figure 12:
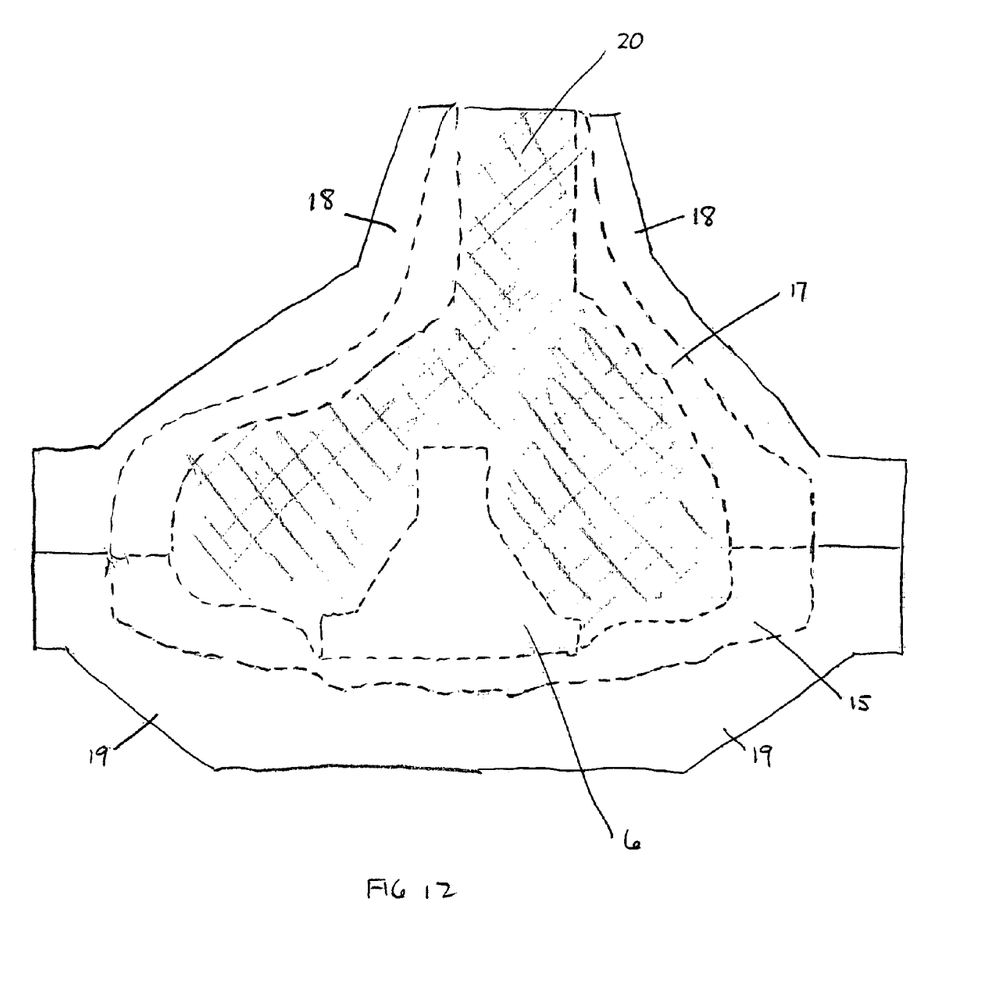

Step L, FIG. 12. Reassemble the rubber mold with its reinforcement containment shell components 18 and 19 and fill the mold through the sprue 14a with a non-flammable fortified cement 20 made from Portland cement fortified with plasticizers, short chopped fiberglass reinforcement fibers, and colored with dyes as appropriate to match the base color of the original specimen being duplicated.

Figure 13:
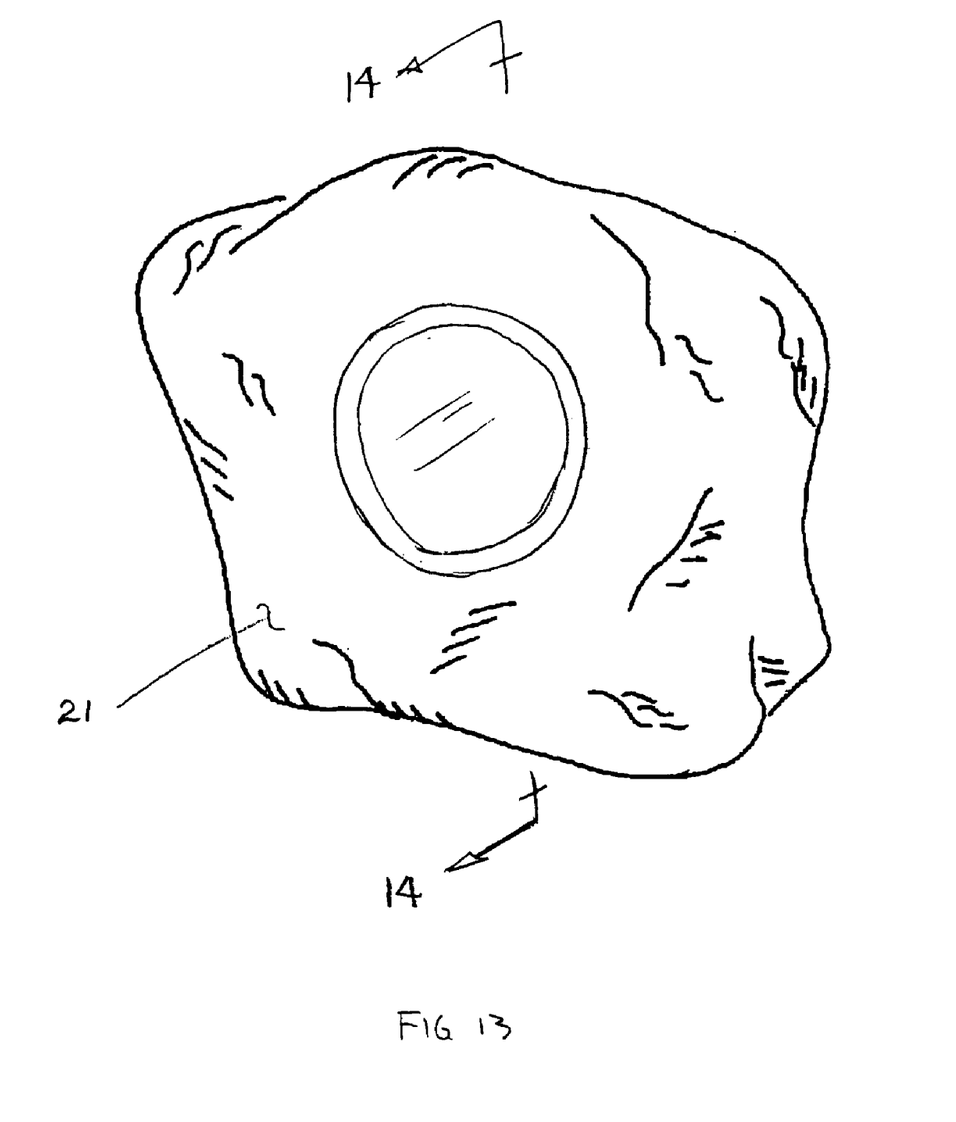
FIGS. 13 and 14 disclose a finished lamp module product.

Step M, FIG. 13. When the fortified cement 20 is fully cured, remove the resulting cast replica 21 of the original specimen and permanently stain it with metallic salts in solution with 28% hydrochloric acid, which solution is capable of causing a permanent discoloration of the undesired color of the casting concrete. These coloring agents are brushed or sprayed onto the surface of the cement replica to reproduce the desired coloration that closely matches the coloration of then origin specimen.

Figure 14:
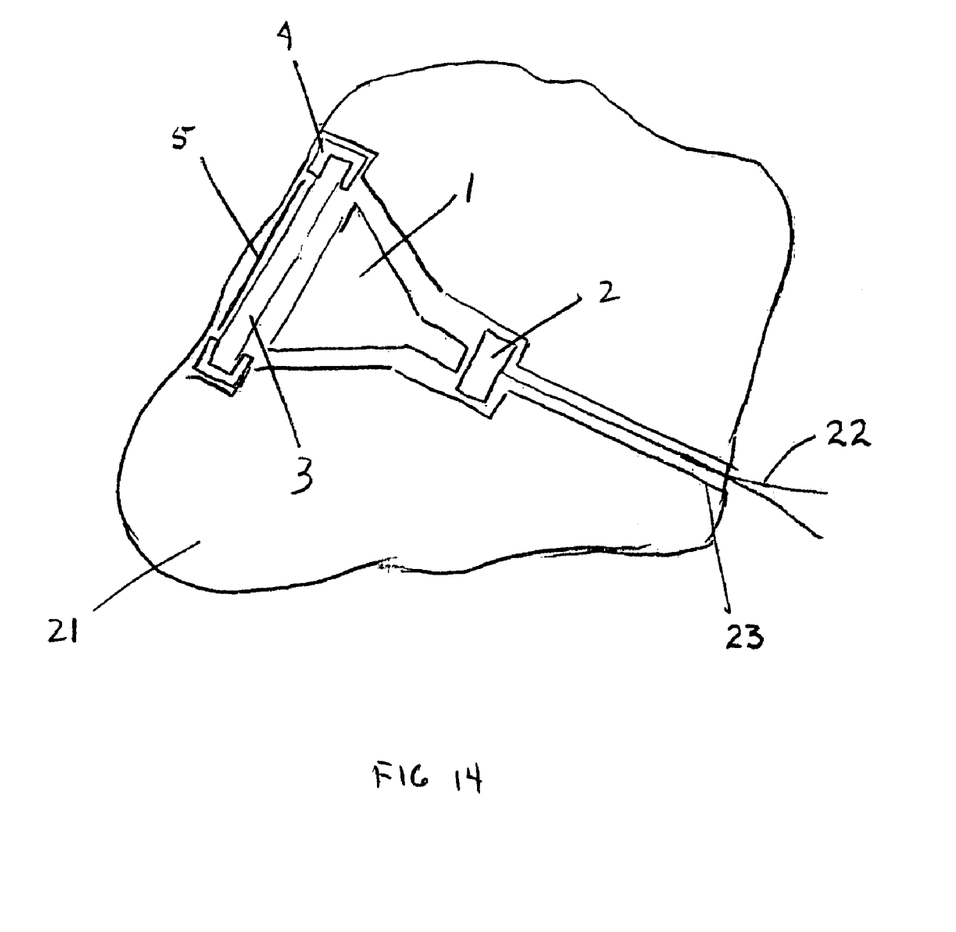

Step N, FIG. 14. Insert the selected lamp 1, base 2 and secure safety lens 3 of FIG. 1 with sealing gasket 4. The wires (22) of the bi-pin lamp socket are pulled through a hole 23 drilled through bottom of the lamp cavity of the recreated specimen and secured at the point of external protrusion with air curing rubber mastic adhesive.

Step O, FIG. 15. An adhesive micro-mesh vinyl film 5 that acts as a one-way light emitter and has been imprinted with the same color and texture as the original specimen, is then attached to the outside surface of the lens or safety window 3 to hide the lamp from view when the lighting module is not illuminated and is viewed in natural light.

Step P. The completed lamp module is placed into a landscape setting as desired and plugged into a suitable low voltage power source. Alternatively for the aforesaid nightclub or restaurant applications mentioned in the background section, the module would be battery powered.

Since variations and modifications of the specification described will occur to those skilled in the art, the scope of the invention is to be limited solely to the terms of the claims and equivalents thereto. For example, the term "rubber" is intended to include any equivalent substance that can be applied to the specimen as described above such as urethane, latex or silicone to produce mold portions for aiding in reproducing the surface texture of the specimen. Any suitable dye or coloring agent may be used in place of the described HCL solution.

I claim:

1. A process of making a realistic full-bodied replica lamp housing of a naturally occurring specimen comprising the steps of:
    (a) providing a natural specimen and identifying a separation line about the specimen that will serve as a mating line for a two or more part rubber mold of the specimen;
    (b) providing a flow barrier member for containing buildup of liquid mold rubber over the specimen at said separation line;
    (c) applying liquid rubber upon a first major portion of said specimen at one side of said flow barrier member to form a first rubber mold portion;
    (d) applying liquid rubber upon a second major portion of said specimen at a second side of said flow barrier member to form a second rubber mold portion;
    (e) applying reinforcing means to said first rubber mold portion and to said second rubber mold portion, enabling said first rubber mold portion and said second rubber mold portion to hold their shapes after the specimen is removed therefrom;
    (f) positioning a three-dimensional pattern adjacent said second rubber mold portion for creating an enclosed lamp component cavity within said full-bodied replica for containing lamp components;
    (g) thereafter reassembling the first and second rubber mold portions, forming a reassembled mold; and
    (h) filling the reassembled mold with a moldable medium for forming an accurately copied full bodied replica of said naturally occurring specimen.

2. The process of claim 1 wherein said natural specimen has a fairly flat surface area, enabling reproduction of a fairly flat surface area upon said full bodied replica of said naturally occurring specimen for facilitating positioning of a light emitting window component therein.

3. The process of claim 1 wherein said naturally occurring specimen is selected from the group consisting of wood, rock and marine specimens.

4. The process of claim 2 wherein said naturally occurring specimen is selected from the group consisting of wood, rock and marine specimens.

5. The process of claim 1 wherein said reinforcing means comprises containment shell components.

6. The process of claim 2 wherein said reinforcing means comprises containment shell components.

7. The process of claim 3 wherein said reinforcing means comprises containment shell components.

8. The process of claim 1 wherein said flow barrier member for containing buildup of liquid mold rubber over the specimen comprises a horizontally protruding member attached to said natural specimen having a substantially vertical side portion.

9. A process of making a realistic full-bodied replica lamp housing of a naturally occurring specimen comprising the steps of:
 (a) providing a natural specimen selected from the group consisting of wood, rock and marine specimens and identifying a separation line about said natural specimen that will serve as a mating line for a two or more part rubber mold of said natural specimen;
 (b) providing a flow barrier member for containing buildup of liquid mold rubber upon the natural specimen at said separation line;
 (c) applying liquid rubber upon a first major portion of said natural specimen at one side of said flow barrier member to form a first rubber mold portion;
 (d) applying liquid rubber upon a second major portion of said natural specimen at a second side of said flow barrier member to form a second rubber mold portion;
 (e) applying reinforcing means to said first rubber mold portion and to said second rubber mold portion, enabling said first rubber mold portion and said second rubber mold portion to hold their shapes after the specimen is removed therefrom;
 (f) attaching a three-dimensional pattern to an inside surface of a rubber mold portion for creating an enclosed lamp component cavity within said full-bodied replica for containing lamp components;
 (g) thereafter reassembling the first and second rubber mold portions, forming a reassembled mold; and
 (h) filling the reassembled mold with concrete for forming an accurately copied full bodied replica of said naturally occurring specimen.

10. The process of claim 9 wherein said natural specimen has a fairly flat surface area, enabling reproduction of the fairly flat surface area upon said full bodied replica of said naturally occurring specimen for facilitating positioning of a light emitting window component therein.

11. The process of claim 9 wherein said concrete is colored with coloring agents to match the base color of the natural specimen being replicated and to mask the color of the concrete.

12. The process of claim 10 wherein said concrete is colored with coloring agents to match the base color of the natural specimen being replicated and to mask the color of the concrete.

13. The process of claim 12 wherein said concrete is fortified with plasticizers and reinforcement fibers.

14. The process of claim 9 wherein said flow barrier member for containing buildup of liquid mold rubber over the specimen comprises a horizontally protruding member attached to said natural specimen having a substantially vertical side portion.

15. The process of claim 10 wherein said flow barrier member for containing buildup of liquid mold rubber over the specimen comprises a horizontally protruding member having a substantially vertical side portion.

16. The process of claim 11 wherein said flow barrier member for containing buildup of liquid mold rubber over the specimen comprises a horizontally protruding member having a substantially vertical side portion.

17. The process of claim 2 wherein a micro-mesh film for blocking the appearance of an un-illuminated lamp is positioned over said light emitting window component and bears a similar coloration scheme as the specimen to be replicated.

18. The process of claim 9 wherein a micro-mesh film for blocking the appearance of an un-illuminated lamp is positioned over said light emitting window component and bears a similar coloration scheme as the specimen to be replicated.

19. A process of making a lamp module having a realistic full-bodied replica of a naturally occurring specimen comprising the steps of:
 (a) providing a natural specimen selected from the group consisting of wood, rock and marine specimens and wherein said natural specimen has a fairly flat surface area, enabling reproduction of the fairly flat surface area upon said full bodied replica of said naturally occurring specimen for facilitating positioning of a light emitting window component therein, and identifying a separation line about said natural specimen that will serve as a mating line for a two or more part rubber mold of said natural specimen;
 (b) providing a flow barrier member for containing buildup of liquid mold rubber upon the natural specimen at said separation line;
 (c) applying liquid rubber upon a first major portion of said natural specimen at one side of said flow barrier member to form a first rubber mold portion;
 (d) thereafter applying liquid rubber upon a second major portion of said natural specimen at a second side of said flow barrier member to form a second rubber mold portion;
 (e) applying first outer mold reinforcing means to said first rubber mold portion and second outer mold reinforcing means to said second rubber mold portion, enabling said first rubber mold portion and said second rubber mold portion to hold their shapes after the specimen is removed therefrom upon separation of said first and second rubber mold portions;
 (f) attaching a three-dimensional pattern to an inside surface of a rubber mold portion for creating a lamp component cavity extending from said fairly flat face into said full bodied replica;
 (g) thereafter reassembling the first and second outer mold reinforcing means having the rubber mold portions therein, forming a reassembled mold; and
 (h) filling the reassembled mold with concrete having a coloring agent therein for matching the base color of the natural specimen being replicated and to mask the color of the concrete.

* * * * *